United States Patent
Zhu

(10) Patent No.: US 11,800,547 B2
(45) Date of Patent: Oct. 24, 2023

(54) INFORMATION TRANSMISSION METHOD AND DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 542 days.

(21) Appl. No.: 17/258,038

(22) PCT Filed: Jul. 6, 2018

(86) PCT No.: PCT/CN2018/094787
§ 371 (c)(1),
(2) Date: Jan. 5, 2021

(87) PCT Pub. No.: WO2020/006745
PCT Pub. Date: Jan. 9, 2020

(65) Prior Publication Data
US 2021/0282149 A1    Sep. 9, 2021

(51) Int. Cl.
*H04W 72/53* (2023.01)
*H04W 28/26* (2009.01)
(Continued)

(52) U.S. Cl.
CPC ........... *H04W 72/53* (2023.01); *H04W 28/26* (2013.01); *H04W 72/0446* (2013.01);
(Continued)

(58) Field of Classification Search
CPC . H04W 72/53; H04W 28/26; H04W 72/0446; H04W 72/0453; H04W 72/23;
(Continued)

(56) References Cited

U.S. PATENT DOCUMENTS 10,251,197 B2 * 4/2019 Yerramalli ........ H04W 74/0816
2017/0064561 A1    3/2017 Tomeba et al.
2018/0263029 A1 * 9/2018 Li .................... H04W 72/21

FOREIGN PATENT DOCUMENTS

CN        107211463 A      9/2017
WO   WO2017132953 A1      8/2017

OTHER PUBLICATIONS

English version of Written Opinion of International Searching Authority for PCT Application No. PCT/CN2018/094787, dated Mar. 20, 2019.

(Continued)

*Primary Examiner* — Hashim S Bhatti
(74) *Attorney, Agent, or Firm* — Finnegan, Henderson, Farabow, Garrett & Dunner, L.L.P.

(57) ABSTRACT

A method and an apparatus for transmitting information is provided by the present disclosure. The method is used in a base station, and the base station configures a plurality of unlicensed channel resources for a terminal. The method includes: detecting a first unlicensed channel resource of the plurality of unlicensed channel resources as being in an unavailable state, the first unlicensed channel resource being configured for transmitting control signaling; determining a second unlicensed channel resource from the plurality of unlicensed channel resources according to a set rule, the second unlicensed channel resource being reserved for transmitting the control signaling; and transmitting the control signaling to the terminal via the second unlicensed channel resource. Therefore, secure transmission of the control signaling can be ensured, reliability of transmitting the control signaling and the service quality of unlicensed channel resources can be improved in the present disclosure.

18 Claims, 9 Drawing Sheets

(51) Int. Cl.
*H04W 72/0446* (2023.01)
*H04W 72/0453* (2023.01)
*H04W 72/23* (2023.01)
*H04W 72/56* (2023.01)

(52) U.S. Cl.
CPC ....... *H04W 72/0453* (2013.01); *H04W 72/23* (2023.01); *H04W 72/56* (2023.01)

(58) Field of Classification Search
CPC ...... H04W 72/56; H04W 16/14; H04L 5/001; H04L 27/0006; H04L 5/0053
See application file for complete search history.

(56) References Cited

OTHER PUBLICATIONS

Extended European Search Report in Application No. 18925164.8, dated Jun. 23, 2021.
Examination Report for Indian Application No. 202147004658, dated Jan. 10, 2022.

* cited by examiner

INFORMATION TRANSMISSION METHOD AND DEVICE

CROSS REFERENCE TO RELATED APPLICATIONS

This application is a national phase application based on International Application No. PCT/CN2018/094787, filed Jul. 6, 2018, the content of which is incorporated herein by reference.

TECHNICAL FIELD

The present disclosure relates to a field of communication technology, and particularly to a method and an apparatus for transmitting information.

BACKGROUND

There is a need for flexible configuration supporting various business types in a new generation of communication system. And different business types correspond to different business requirements. For example, the requirement for the business type of eMBB (enhanced Mobile Broad Band) mainly focuses on large bandwidth and high speed, etc.; the requirement for the business type of URLLC (Ultra Reliable Low Latency Communication) mainly focuses on high reliability and low latency; the requirement for the business type of mMTC (massive Machine Type Communication) mainly focuses on massive connections. However, with the driving of business requirements, the only usage of licensed spectrum cannot meet more business requirements in the new generation of communication system.

SUMMARY

In order to overcome the problem existed in the related art, a method and an apparatus for transmitting information is provided by embodiments of the present disclosure.

According to a first aspect of embodiments in the present disclosure, a method for transmitting information is provided. The method is used in a base station, and the base station configures a plurality of unlicensed channel resources for a terminal. The method includes:
  detecting a first unlicensed channel resource of the plurality of unlicensed channel resources that is in an unavailable state, the first unlicensed channel resource being configured for transmitting control signaling;
  determining a second unlicensed channel resource from the plurality of unlicensed channel resources according to a set rule, the second unlicensed channel resource being reserved for transmitting the control signaling; and
  transmitting the control signaling to the terminal via the second unlicensed channel resource.

Optionally, the plurality of unlicensed channel resources may include a plurality of bandwidth parts configured on one unlicensed carrier, or a plurality of unlicensed carriers, or a plurality of bandwidth parts configured on a plurality of unlicensed carriers.

Optionally, the set rule may include a random order or a priority order for the plurality of unlicensed channel resources.

The determining the second unlicensed channel resource from the plurality of unlicensed channel resources according to the set rule may include:
  randomly selecting one or more unlicensed channel resources in an available state from the plurality of unlicensed channel resources based on the random order, as the second unlicensed channel resource; or
  selecting one or more unlicensed channel resources in the available state from the plurality of unlicensed channel resources preferentially according to the priority order, as the second unlicensed channel resource.

Optionally, the set rule includes a first correspondence between a transmission location on the first unlicensed channel resource that is configured for transmitting the control signaling and a reserved unlicensed channel resource.

The determining the second unlicensed channel resource from the plurality of unlicensed channel resources according to the set rule includes:
  determining a detection location corresponding to the unavailable state as a first transmission location; and
  determining the configured reserved unlicensed channel resource corresponding to the first transmission location as the second unlicensed channel resource according to the first correspondence.

Optionally, the set rule includes a constant unlicensed channel resource reserved for transmitting the control signaling.

The determining the second unlicensed channel resource from the plurality of unlicensed channel resources according to the set rule includes:
  determining the constant unlicensed channel resource as the second unlicensed channel resource.

Optionally, the set rule includes a second correspondence between a transmission location on the first unlicensed channel resource that is configured for transmitting the control signaling and a reserved transmission location.

The transmitting the control signaling to be transmitted to the terminal via the second unlicensed channel resource includes:
  determining a detection location corresponding to the unavailable state as a first transmission location;
  determining a second transmission location on the second unlicensed channel resource that is reserved for transmitting the control signaling according to the reserved transmission location corresponding to the first transmission location in the second correspondence; and
  transmitting the control signaling to the terminal at the second transmission location on the second unlicensed channel resource.

Optionally, the second transmission location and the first transmission location have a same starting position or different starting positions with a limited time interval therebetween in time domain. The set rule further includes a configuration mode for representing configuration of the control signaling.

The transmitting the control signaling to the terminal at the second transmission location on the second unlicensed channel resource includes:
  transmitting the control signaling to the terminal at the second transmission location on the second unlicensed channel resource according to the configuration mode.

Optionally, the method further includes:
  transmitting the control signaling to the terminal via the first unlicensed channel resource in response to detecting that the first unlicensed channel resource is in an available state; and
  refraining the transmission of the control signaling in response to detecting that each of the plurality of unlicensed channel resources is in an unavailable state.

According to a second aspect of embodiments of the present disclosure, a method for transmitting information is provided. The method is used in a terminal, and a base station configures a plurality of unlicensed channel resources for the terminal. The method includes:

detecting a first unlicensed channel resource of the plurality of unlicensed channel resources that is in an unavailable state, the first unlicensed channel resource being configured for transmitting control signaling;

determining a third unlicensed channel resource from the plurality of unlicensed channel resources that is reserved for transmitting the control signaling according to a set rule; and receiving the control signaling via the third unlicensed channel resource.

Optionally, the plurality of unlicensed channel resources include: a plurality of bandwidth parts configured on one unlicensed carrier, or a plurality of unlicensed carriers, or a plurality of bandwidth parts configured on a plurality of unlicensed carriers.

Optionally, the set rule includes a random order for the plurality of unlicensed channel resources.

The determining the third unlicensed channel resource from the plurality of unlicensed channel resources according to the set rule includes:

determining all unlicensed channel resources in the available state in the plurality of unlicensed channel resources as the third unlicensed channel resource according to the random order.

The receiving the control signaling via the third unlicensed channel resource includes:

performing a signaling detection on each of the third unlicensed channel resources until the control signaling is received.

Optionally, the set rule includes a priority order for the plurality of unlicensed channel resources.

The determining the third unlicensed channel resource from the plurality of unlicensed channel resources according to the set rule includes:

determining all unlicensed channel resources in the available state in the plurality of unlicensed channel resources as third unlicensed channel resources; and sorting respective third unlicensed channel resources according to the priority order, to obtain respective ordered third unlicensed channel resources.

The receiving the control signaling via the third unlicensed channel resource includes:

performing signaling detections on the respective ordered third unlicensed channel resources sequentially until the control signaling is received.

Optionally, the set rule includes a first correspondence between a transmission location on the first unlicensed channel resource that is configured for transmitting the control signaling and a reserved unlicensed channel resource.

The determining the third unlicensed channel resource from the plurality of unlicensed channel resources according to the set rule includes:

determining a detection location corresponding to the unavailable state as a first transmission location; and determining the reserved unlicensed channel resource corresponding to the first transmission location as the third unlicensed channel resource according to the first correspondence.

Optionally, the set rule includes a constant unlicensed channel resource reserved for transmitting the control signaling.

The determining the third unlicensed channel resource from the plurality of unlicensed channel resources according to the set rule includes:

determining the constant unlicensed channel resource as the third unlicensed channel resource.

Optionally, the set rule includes a second correspondence between a transmission location on the first unlicensed channel resource that is configured for transmitting the control signaling and a reserved transmission location.

The receiving the control signaling via the third unlicensed channel resource includes:

determining a detection location corresponding to the unavailable state as a first transmission location;

determining a third transmission location on the third unlicensed channel resource that is reserved for transmitting the control signaling according to the reserved transmission location corresponding to the first transmission location in the second correspondence; and receiving the control signaling at the third transmission location on the third unlicensed channel resource.

Optionally, the third transmission location and the first transmission location have a same starting position in time domain or different starting positions with a limited time interval therebetween in time domain. The set rule further includes a configuration mode for representing configuration of the control signaling.

The receiving the control signaling at the third transmission location on the third unlicensed channel resource includes:

receiving the control signaling at the third transmission location on the third unlicensed channel resource according to the configuration mode.

Optionally, the set rule is specified by a communication protocol, or signaled to the terminal by the base station through a configured signaling. The configured signaling comprising at least one of: an RRC (Radio Resource Control) signaling; or a MAC-CE (Media Access Control-Control Element) signaling; or a physical layer signaling.

Optionally, the method further includes:

receiving the control signaling via the first unlicensed channel resource in response to detecting that the first unlicensed channel resource is in an available state; and refraining reception of the control signaling in response to detecting that each of a plurality of unlicensed channel resources is in an unavailable state.

According to a third aspect of embodiments of the present disclosure, an apparatus for transmitting information is provided. The apparatus is used in a base station, and the base station configures a plurality of unlicensed channel resources for a terminal. The apparatus includes:

a first detection module, configured to detect a first unlicensed channel resource of the plurality of unlicensed channel resources that is in an unavailable state, the first unlicensed channel resource being configured for transmitting control signaling;

a first determining module, configured to determine a second unlicensed channel resource from the plurality of unlicensed channel resources according to a set rule, the second unlicensed channel resource being reserved for transmitting the control signaling; and a first transmitting module, configured to transmit the control signaling to the terminal via the second unlicensed channel resource.

Optionally, the plurality of unlicensed channel resources include: a plurality of bandwidth parts configured on one unlicensed carrier, or a plurality of unlicensed carriers, or a plurality of bandwidth parts configured on a plurality of unlicensed carriers.

Optionally, the set rule includes a random order or a priority order for the plurality of unlicensed channel resources. The first determining module includes:
- a first determining submodule, configured to randomly select one or more unlicensed channel resources in the available state from the plurality of unlicensed channel resources based on the random order, as the second unlicensed channel resource; or
- a second determining submodule, configured to select one or more unlicensed channel resources in the available state from the plurality of unlicensed channel resources preferentially according to the priority order, as the second unlicensed channel resource.

Optionally, the set rule includes a first correspondence between a transmission location on the first unlicensed channel resource that is configured for transmitting the control signaling and a reserved unlicensed channel resource. The first determining module includes:
- a third determining submodule, configured to determine a detection location corresponding to the unavailable state as a first transmission location; and
- a fourth determining submodule, configured to determine the reserved unlicensed channel resource corresponding to the first transmission location as the second unlicensed channel resource according to the first correspondence.

Optionally, the set rule includes a constant unlicensed channel resource reserved for transmitting the control signaling. The first determining module includes:
- a fifth determining submodule, configured to determine the constant unlicensed channel resource as the second unlicensed channel resource.

Optionally, the set rule includes a second correspondence between the transmission location on the first unlicensed channel resource that is configured for transmitting the control signaling and the reserved transmission location. The first transmitting module includes:
- a sixth determining submodule, configured to determine a detection location corresponding to the unavailable state as a first transmission location;
- a seventh determining submodule, configured to determine a second transmission location on the second unlicensed channel resource that is reserved for transmitting the control signaling according to the reserved transmission location corresponding to the first transmission location in the second correspondence; and
- a first transmitting submodule, configured to transmit the control signaling to the terminal at the second transmission location on the second unlicensed channel resource.

Optionally, the second transmission location and the first transmission location have a same starting position or different starting positions with a limited time interval therebetween in time domain. The set rule further includes a configuration mode for representing configuration of the control signaling. The first transmitting submodule includes:
- a second transmitting submodule, configured to transmit the control signaling to the terminal at the second transmission location on the second unlicensed channel resource according to the configuration mode.

Optionally, the apparatus further includes:
- a second transmitting module, configured to transmit the control signaling to the terminal via the first unlicensed channel resource in response to detecting that the first unlicensed channel resource is in an available state; and
- a transmission refraining module, configured to refrain the transmission of the control signaling in response to detecting that each of a plurality of unlicensed channel resources is in an unavailable state.

According to a fourth aspect of embodiments of the present disclosure, an apparatus for transmitting information is provided. The apparatus is used in a terminal, and a base station configures a plurality of unlicensed channel resources for the terminal. The apparatus includes:
- a second detection module, configured to detect a first unlicensed channel resource of the plurality of unlicensed channel resources that is in an unavailable state, the first unlicensed channel resource being configured for transmitting control signaling;
- a second determining module, configured to determine a third unlicensed channel resource from the plurality of unlicensed channel resources that is reserved for transmitting the control signaling according to a set rule; and
- a first receiving module, configured to receive the control signaling via the third unlicensed channel resource.

Optionally, the plurality of unlicensed channel resources comprise a plurality of bandwidth parts configured on one unlicensed carrier, or a plurality of unlicensed carriers, or a plurality of bandwidth parts configured on a plurality of unlicensed carriers.

Optionally, the set rule includes a random order for the plurality of unlicensed channel resources. The second determining module includes:
- an eighth determining submodule, configured to determine all unlicensed channel resources in the available state in the plurality of unlicensed channel resources as third unlicensed channel resources according to the random order.

The first receiving module includes:
- a first detection submodule, configured to perform a signaling detection on each of the third unlicensed channel resources until the control signaling is received.

Optionally, the set rule includes a priority order for the plurality of unlicensed channel resources. The second determining module includes:
- a ninth determining submodule, configured to determine all unlicensed channel resources in the available state in the plurality of unlicensed channel resources as third unlicensed channel resources.

The first receiving module includes:
- a second detection submodule, configured to perform signaling detections on the respective ordered third unlicensed channel resources sequentially until the control signaling is received.

Optionally, the set rule includes a first correspondence between a transmission location on the first unlicensed channel resource that is configured for transmitting the control signaling and a reserved unlicensed channel resource. The second determining module includes:
- a tenth determining sub-module, configured to determine a detection location corresponding to the unavailable state as a first transmission location; and
- an eleventh determining submodule, configured to determine the reserved unlicensed channel resource corresponding to the first transmission location as the third unlicensed channel resource according to the first correspondence.

Optionally, the set rule includes a constant unlicensed channel resource reserved for transmitting the control signaling. The second determining module includes:

a twelfth determining submodule, configured to determine the constant unlicensed channel resource as the third unlicensed channel resource.

Optionally, the set rule includes a second correspondence between the transmission location on the first unlicensed channel resource that is configured for transmitting the control signaling and the reserved transmission location. The first receiving module includes:

a thirteenth determining submodule, configured to determine a third transmission location on the third unlicensed channel resource that is reserved for transmitting the control signaling according to a reserved transmission location corresponding to the first transmission location in the second correspondence; and a first receiving submodule, configured to receive the control signaling at the third transmission location on the third unlicensed channel resource.

Optionally, the third transmission location and the first transmission location have a same starting position or different starting positions with a limited time interval therebetween in time domain. The set rule further includes a configuration mode for representing configuration of the control signaling. The first receiving submodule includes:

a second receiving submodule, configured to receive the control signaling at the third transmission location on the third unlicensed channel resource according to the configuration mode.

Optionally, the set rule is specified by a communication protocol, or signaled to the terminal by the base station through a configured signaling. The configured signaling includes at least one of: an RRC signaling; or a MAC-CE signaling; or a physical layer signaling.

Optionally, the apparatus further includes:

a second receiving module, configured to receive the control signaling via the first unlicensed channel resource in response to detecting that the first unlicensed channel resource is in an available state; and a reception refraining module, configured to refrain reception of the control signaling in response to detecting that each of a plurality of unlicensed channel resources is in an unavailable state.

According to a fifth aspect of embodiments of the present disclosure, a non-transitory computer-readable storage medium having a computer program stored thereon is provided. The computer program is configured to execute the method for transmitting information of the above first aspect.

According to a sixth aspect of some embodiments of the present disclosure, a non-transitory computer-readable storage medium having a computer program stored thereon is provided. The computer program is configured to the method for transmitting information of the above second aspect According to a seventh aspect of embodiments of the present disclosure, an apparatus for transmitting information is provided. The apparatus is used in a base station, and the base station configures a plurality of unlicensed channel resources for a terminal. The apparatus includes:

a processor; and a memory configured to store instructions executable by the processor;

wherein the processor is configured to:

detect a first unlicensed channel resource of the plurality of unlicensed channel resources that is in an unavailable state, the first unlicensed channel resource being configured for transmitting control signaling;

determine a second unlicensed channel resource from the plurality of unlicensed channel resources according to a set rule, the second unlicensed channel resource being reserved for transmitting the control signaling; and transmit the control signaling to the terminal via the second unlicensed channel resource.

According to an eighth aspect of embodiments of the present disclosure, an apparatus for transmitting information is provided. The apparatus is used in a terminal, and a base station configures a plurality of unlicensed channel resources for the terminal. The apparatus includes:

a processor; and a memory configured to store instructions executable by the processor;

wherein the processor is configured to:

detect a first unlicensed channel resource of the plurality of unlicensed channel resources that is in an unavailable state, the first unlicensed channel resource being configured for transmitting control signaling;

determine a third unlicensed channel resource from the plurality of unlicensed channel resources that is reserved for transmitting the control signaling according to a set rule; and receive the control signaling via the third unlicensed channel resource.

The technical solutions provided in the embodiments of the present disclosure may have the following advantageous effects:

The base station in the embodiments of the present disclosure may detect that a first unlicensed channel resource of the plurality of unlicensed channel resources the first unlicensed channel resource being configured for transmitting control signaling is in an unavailable state, and may determine a second unlicensed channel resource from the plurality of unlicensed channel resources the second unlicensed channel resource being reserved for transmitting the control signaling according to a set rule, and transmit the control signaling to the terminal through the second unlicensed channel resource. Therefore, secure transmission of the control signaling can be ensured, reliability of transmitting the control signaling and the service quality of unlicensed channel resources can be improved in the present disclosure.

The terminal in the embodiments of the present disclosure may detect that a first unlicensed channel resource of the plurality of unlicensed channel resources the first unlicensed channel resource being configured for transmitting control signaling is in an unavailable state, and may determine a third unlicensed channel resource from the plurality of unlicensed channel resources the second unlicensed channel resource being reserved for transmitting the control signaling according to a set rule, and receive the control signaling through the third unlicensed channel resource. Therefore, secure transmission of the control signaling can be ensured, reliability of transmitting the control signaling and the service quality of unlicensed channel resources can be improved in the present disclosure.

It is to be understood that the above general description and the following detailed description are only exemplary and explanatory, and should not limit the present disclosure.

BRIEF DESCRIPTION OF THE DRAWINGS

The drawings herein are incorporated into the specification and constitute a part of the specification, show embodi

DETAILED DESCRIPTION

Here, exemplary embodiments will be described in detail and examples thereof are shown in the accompanying drawings. When the following description refers to the accompanying drawings, unless otherwise indicated, the same numbers in different drawings represent the same or similar elements. The implementations described in the following exemplary embodiments do not represent all implementations consistent with the present invention. Rather, they are merely examples of the apparatus and method consistent with some aspects of the present invention as stated in the appended claims.

Here, exemplary embodiments will be described in detail and examples thereof are shown in the accompanying drawings. When the following description refers to the accompanying drawings, unless otherwise indicated, the same numbers in different drawings represent the same or similar elements. The implementations described in the following exemplary embodiments do not represent all implementations consistent with the present invention. Rather, they are merely examples of the apparatus and method consistent with some aspects of the present invention as stated in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms such as first, second and third may be used in this disclosure to describe various information, these information should not be limited to these terms. These terms are only used to distinguish the same type of information from each other. For example, without departing from the scope of the present disclosure, indication information may also be referred to as a second information, and similarly, the second information may also be referred to as indication information. Depending on the context, the word "if" as used herein may be interpreted as "when" or "upon" or "in response to determination".

Figure 1:
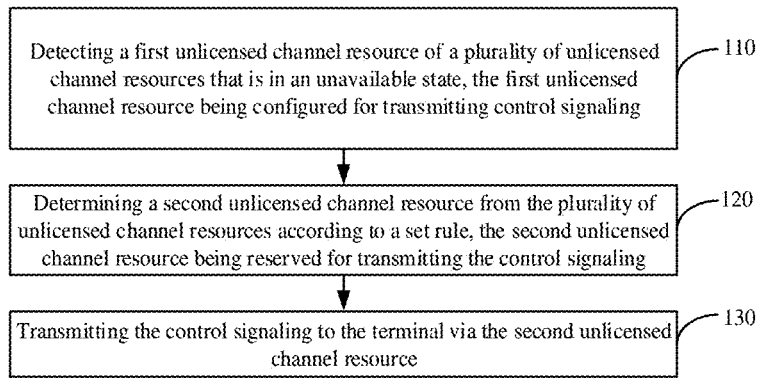
- FIG. 1 is a flowchart illustrating a method for transmitting information according to an exemplary embodiment.
Figure 2:
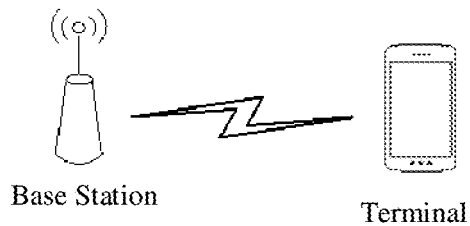
FIG. 2 is an application scenario diagram illustrating a method for transmitting information according to an exemplary embodiment.

FIG. 1 illustrates a flowchart showing a method for transmitting information according to an exemplary embodiment. FIG. 2 illustrates a diagram showing an application scenario of the method for transmitting information according to the exemplary embodiment. The method for transmitting information may be applied to a base station, and the base station configures a plurality of unlicensed channel resources for a terminal. As shown in FIG. 1, the method for transmitting information includes the following steps 110-130.

At step 110, a first unlicensed channel resource of the plurality of unlicensed channel resources that is in an unavailable state is detected, the first unlicensed channel resource being configured for transmitting control signaling.

In some embodiments of the present disclosure, information transmission may be configured for transmitting the control signaling. For example, a CORESET (control resource set) may be used for carrying the transmission of the control signaling. Specifically, the control signaling to be transmitted may be a downlink control signaling.

The first unlicensed channel resource may be an unlicensed channel resource which is configured by the base station for the terminal and configured for transmitting the control signaling. Additionally, the base station may signal to the terminal in advance a possible location for transmitting the control signaling. Then, the terminal may receive the control signaling at a possible corresponding location based on the signaling from the base station.

However, in operations on an unlicensed spectrum, the first unlicensed channel resource may be either in an available state or in an unavailable state due to unpredictability of channel occupation. Accordingly, in the present disclosure, the base station may transmit the control signaling to the terminal via an unlicensed channel resource directly in the available state, and may additionally transmit a standby control signaling to the terminal via a second unlicensed channel resource reserved for transmitting the control signaling in the unavailable state, thereby improving reliability of the information transmission.

In an embodiment, the plurality of unlicensed channel resources in the above step 110 may include but not limited to the following three cases.

(1-1) A plurality of bandwidth parts configured on one unlicensed carrier

In this case, the plurality of unlicensed channel resources configured by the base station for the terminal may be the plurality of bandwidth parts on the unlicensed carrier. Here, the bandwidth part may refer to continuous resources at a frequency band within one carrier.

(1-2) A plurality of unlicensed carriers

In this case, the plurality of unlicensed channel resources configured by the base station for the terminal may be the plurality of unlicensed carriers.

(1-3) A plurality of bandwidth parts configured on a Plurality of Unlicensed Carriers In this case, the plurality of unlicensed channel resources configured by the base station for the terminal may be the plurality of bandwidth parts on the plurality of unlicensed carriers. Here, the bandwidth part may refer to continuous resources at a frequency band within one carrier.

At step 120, a second unlicensed channel resource is determined from the plurality of unlicensed channel resources according to a set rule, the second unlicensed channel resource being reserved for transmitting the control signaling.

In some embodiments of the present disclosure, in operations on the unlicensed spectrum, when the base station determines that the first unlicensed channel resource is in an unavailable state, it is required to further determine the second unlicensed channel resource reserved for transmitting the control signaling according to the set rule, due to the unpredictability of channel occupation, and to transmit the standby control signaling to the terminal via the second unlicensed channel resource, thereby ensuring the reliability of transmitting the control signaling.

Here, the set rule may be specified by a communication protocol or configured by the base station, and may be singled to the terminal through a configured signaling. The configured signaling may include at least one of an RRC (Radio Resource Control) signaling, a MAC-CE (Media Access Control-Control Element) signaling, or a physical layer signaling.

At step 130, the control signaling is transmitted to the terminal via the second unlicensed channel resource.

In some embodiments of the present disclosure, when the first unlicensed channel resource is in the unavailable state, the base station may perform the information transmission via the second unlicensed channel resource. The base station may configure autonomously how to transmit the control signaling to the terminal via the second unlicensed channel resource, as the case may be.

Figure 3A:
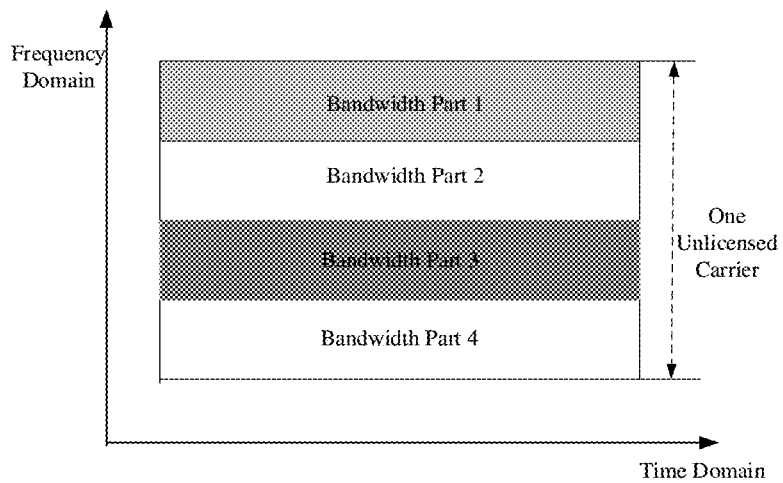
FIG. 3A is a schematic diagram illustrating a plurality of bandwidth parts according to an exemplary embodiment.

In an exemplary scenario, as shown in FIG. 2, a base station and a terminal may be included. As shown in FIG. 3A, the base station may configure four bandwidth parts on one unlicensed carrier for the terminal, i.e., a bandwidth part 1, a bandwidth part 2, a bandwidth part 3, and a bandwidth part 4. The bandwidth part 1 is the first unlicensed channel resource configured by the base station for the terminal and configured for transmitting the control signaling. When the base station detects that the bandwidth part 1 is in an unavailable state, it may determine the second unlicensed channel resource reserved for transmitting the control signaling from the bandwidth part 2, the bandwidth part 3 and the bandwidth part 4 according to the set rule. For example, the second unlicensed channel resource may be determined as the bandwidth part 2. Then, the base station may transmit the control signaling to the terminal via the bandwidth part 2. This ensures that the control signaling may be transmitted to the terminal even when the bandwidth part 1 is in an unavailable state, thereby improving the reliability of transmitting the control signaling.

From the above embodiments, it may be understood that the second unlicensed channel resource reserved for transmitting the control signaling may be determined from the plurality of unlicensed channel resources according to the set rule, in response to detecting that the first unlicensed channel resource being configured for transmitting the control signaling in the plurality of unlicensed channel resources is in an unavailable state, and the control signaling may be transmitted to the terminal via the second unlicensed channel resource, which ensures secure transmission of the control signaling, improves the reliability of transmitting the control signaling, and improves service quality of the unlicensed channel resources.

In an embodiment, the set rule in the above step 120 may include but not limited to the following four cases.

(2-1) The set rule includes a random order or a priority order for the plurality of unlicensed channel resources.

In this case, when the base station determines the second unlicensed channel resource, it may randomly select one or more unlicensed channel resources in the available state from the plurality of unlicensed channel resources based on the random order, as the second unlicensed channel resource; or it may select one or more unlicensed channel resources in the available state from the plurality of unlicensed channel resources preferentially according to the priority order, as the second unlicensed channel resource.

For example, as shown in FIG. 3A, the priority order for the four bandwidth parts may be: the bandwidth part 1, the bandwidth part 2, the bandwidth part 3, and the bandwidth part 4. In a case where the bandwidth part 1 is in the unavailable state:

if each of the bandwidth part 2, the bandwidth part 3 and the bandwidth part 4 is in the available state, the bandwidth part 2 may be selected as the second unlicensed channel resource preferentially;

if the bandwidth part 2 is in the unavailable state but the bandwidth part 3 and the bandwidth part 4 are both in the available state, the bandwidth part 3 may be selected as the second unlicensed channel resource preferentially; and if the bandwidth part 2 and the bandwidth part 3 are both in the unavailable state but the bandwidth part 4 is in the available state, the bandwidth part 4 may be selected as the second unlicensed channel resource preferentially.

Otherwise, if all the bandwidth part 2, the bandwidth part 3 and the bandwidth part 4 are in the unavailable state, the base station will refrain the transmission of the control signaling.

(2-2) The set rule includes a first correspondence between a transmission location on the first unlicensed channel resource that is configured for transmitting the control signaling and a reserved unlicensed channel resource. The reserved unlicensed channel resources corresponding to different transmission locations may be identical or different.

In this case, when the base station determines the second unlicensed channel resource, it may first determine a detection location corresponding to the unavailable state as a first transmission location, and then determine the reserved unlicensed channel resource corresponding to the first transmission location as the second unlicensed channel resource according to the first correspondence.

Figure 3B:
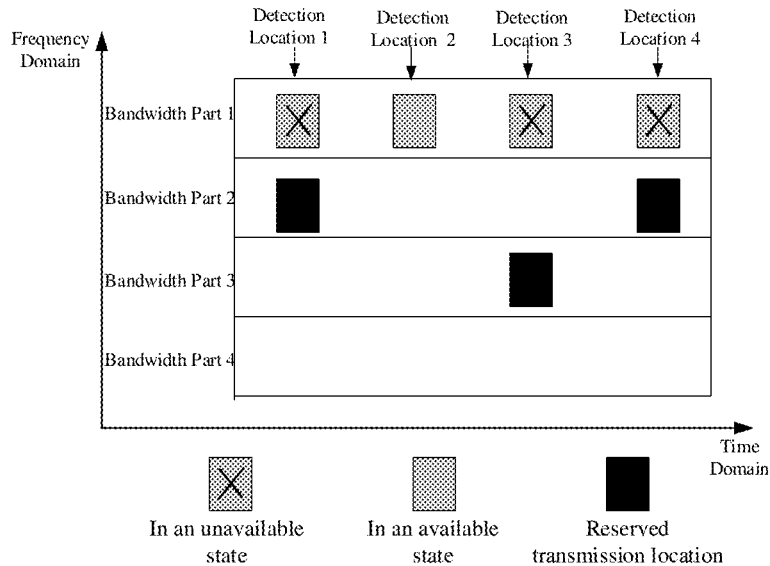
FIG. 3B is another schematic diagram illustrating a plurality of bandwidth parts according to an exemplary embodiment.

For example, as shown in FIG. 3B, the base station configures four bandwidth parts on one unlicensed carrier for the terminal, i.e., the bandwidth part 1, the bandwidth part 2, the bandwidth part 3, and the bandwidth part 4. The bandwidth part 1 is the first unlicensed channel resource configured by the base station for the terminal and configured for transmitting the control signaling.

The transmission location on the bandwidth part 1 that is configured for transmitting the control signaling may include a detection location 1, a detection location 2, a detection location 3 and a detection location 4. Meanwhile, the first correspondence included in the set rule may specifically include the bandwidth part 2 being the reserved unlicensed channel resource corresponding to the detection location 1, the bandwidth part 4 being the reserved unlicensed channel resource corresponding to the detection location 2, the bandwidth part 3 being the reserved unlicensed channel resource corresponding to the detection location 3, and the bandwidth part 2 being the reserved unlicensed channel resource corresponding to the detection location 4.

If the base station detects at the detection location 1 that the bandwidth part 1 is in the unavailable state, it may determine the bandwidth part 2 as the second unlicensed channel resource reserved for transmitting the control signaling according to the first correspondence included in the set rule. If the base station detects at the detection location 2 that the bandwidth part 1 is in the available state, it may transmit the control signaling to the terminal directly via the bandwidth part 1. If the base station detects at the detection location 3 that the bandwidth part 1 is in the unavailable state, it may determine the bandwidth part 3 as the second unlicensed channel resource reserved for transmitting the control signaling according to the first correspondence included in the set rule. And if the base station detects at the detection location 4 that the bandwidth part 1 is in the unavailable state, it may determine the bandwidth part 2 as the second unlicensed channel resource reserved for transmitting the control signaling according to the first correspondence included in the set rule.

(2-3) The set rule includes a constant unlicensed channel resource reserved for transmitting the control signaling.

In this case, when the base station determines the second unlicensed channel resource, it may determine the constant unlicensed channel resource as the second unlicensed channel resource.

For example, as shown in FIG. 3A, the constant unlicensed channel resource is the bandwidth part 2. When the bandwidth part 1 is in the unavailable state, the base station may determine the bandwidth part 2 as the second unlicensed channel resource reserved for transmitting the control signaling directly. Here, a number of the constant unlicensed channel resources may be one or more. Particularly, when one of the reserved unlicensed channel resources is also in the unavailable state, another one of the reserved unlicensed channel resources may be selected as the second unlicensed channel resource.

From the above-mentioned embodiments, it may be understood that different second unlicensed channel resources reserved for transmitting the control signaling may be determined according to different contents included in the set rule, which may improve the flexibility of the reserved transmission and also improve the efficiency of transmitting the control signaling.

In an embodiment, the set rule includes a second correspondence between the transmission location on the first unlicensed channel resource that is configured for transmitting the control signaling and the reserved transmission location, e.g., the configured transmission location and the reserved transmission location having a same starting position or different starting positions with a limited time interval therebetween in time domain. Then, when the step 130 is performed, the following steps may be further included:

(3-1) determining a detection location corresponding to the unavailable state as a first transmission location; and determining a second transmission location on the second unlicensed channel resource that is reserved for transmitting the control signaling according to the reserved transmission location corresponding to the first transmission location in the second correspondence; and (3-2) transmitting the control signaling to the terminal at the second transmission location on the second unlicensed channel resource.

For example, as shown in FIG. 3B, if the base station detects at the detection location 1 that the bandwidth part 1 is in the unavailable state, it may determine the bandwidth part 2 as the second unlicensed channel resource reserved for transmitting the control signaling according to the first correspondence included in the set rule, and then determine a second transmission location on the bandwidth part 2 that is reserved for transmitting the control signaling according to the second correspondence included in the set rule.

In an embodiment, the second transmission location and the first transmission location have a same starting position or different starting positions with a limited time interval therebetween in time domain. Further, the set rule may include a configuration mode for representing configuration of the control signaling. Then, when the above step (3-2) is performed, the control signaling may be transmitted to the terminal at the second transmission location on the second unlicensed channel resource according to the configuration mode.

Here, the configuration mode may include information such as an information transmission format, a number of information transmission, a level of aggregation, or the like.

From the above-mentioned embodiments, it may be understood that the control signaling may be transmitted to the terminal at the second transmission location on the second unlicensed channel resource according to the configuration mode, thereby improving the accuracy of transmitting the control signaling.

Figure 4:
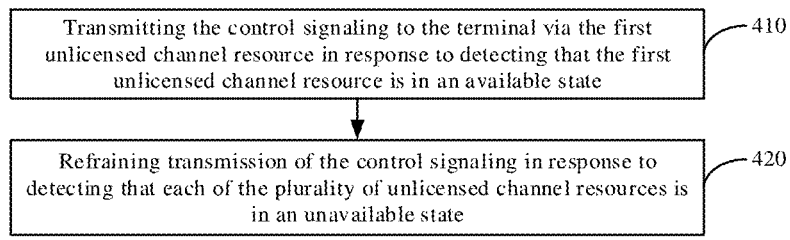
FIG. 4 is a flowchart illustrating another method for transmitting information according to an exemplary embodiment.

FIG. 4 illustrates a flowchart showing another method for transmitting information according to an exemplary embodiment. The method for transmitting information may be applied to a base station. On a basis of the method illustrated in FIG. 1, as shown in FIG. 4, the method for transmitting information may further include the following steps 410-420.

At step 410, when a first unlicensed channel resource that is in an available state is detected, the control signaling is transmitted to the terminal via the first unlicensed channel resource.

At step 420, when each of the plurality of unlicensed channel resources that is in an unavailable state is detected, the transmission of the control signaling is refrained.

From the above-mentioned embodiments, it may be understood that the control signaling may be transmitted to the terminal via the first unlicensed channel resource directly in response to detecting that the first unlicensed channel resource is in the available state, and the transmission of the control signaling may be refrained in response to detecting that each of the plurality of unlicensed channel resources is in the unavailable state, which avoids waste of resources and improves applicability of transmitting the control signaling.

Figure 5:
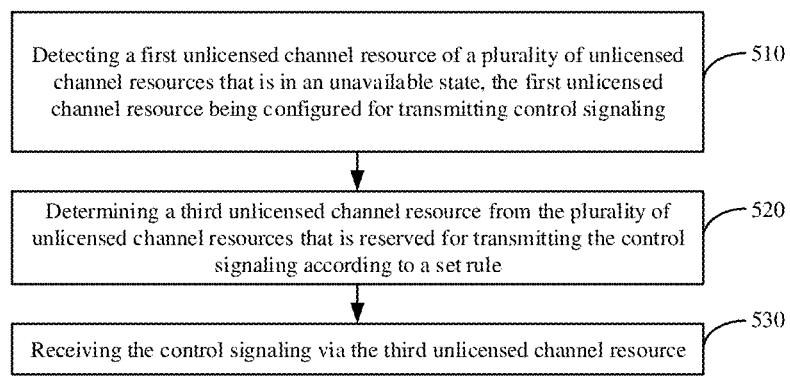
FIG. 5 is a flowchart illustrating a method for transmitting information according to an exemplary embodiment.

FIG. 5 illustrates a flowchart showing a method for transmitting information according to an exemplary embodiment. Further, FIG. 2 illustrates a diagram showing an application scenario of the method for transmitting information according to the exemplary embodiment. The method for transmitting information may be applied to a terminal, and a base station configures a plurality of unlicensed channel resources for the terminal. As shown in FIG. 5, the method for transmitting information may include the following steps 510-530.

At step 510, a first unlicensed channel resource of the plurality of unlicensed channel resources that is in an unavailable state is detected, the first unlicensed channel resource being configured for transmitting control signaling.

In some embodiments of the present disclosure, information transmission may be configured for transmitting the control signaling. For example, a CORESET (control resource set) may be used for carrying the transmission of the control signaling.

If the first unlicensed channel resource is in an available state, the terminal may receive the control signaling directly through the first unlicensed channel resource. However, if the first unlicensed channel resource is in the unavailable state, the terminal needs to further determine a third unlicensed channel resource reserved for transmitting the control signaling from the plurality of unlicensed channel resources, and to receive the control signaling via the third unlicensed channel resource.

In an embodiment, the plurality of unlicensed channel resources in the above step 510 may include a plurality of bandwidth parts configured on one unlicensed carrier, or a plurality of unlicensed carriers, or a plurality of bandwidth parts configured on a plurality of unlicensed carriers.

At step 520, a third unlicensed channel resource is determined from the plurality of unlicensed channel resources that is reserved for transmitting the control signaling according to a set rule.

In some embodiments of the present disclosure, in operations on an unlicensed spectrum, when the terminal determines that the first unlicensed channel resource is in an unavailable state, it is required to further determine the third unlicensed channel resource reserved for transmitting the control signaling according to the set rule, due to the unpredictability of channel occupation, and to receive the control signaling via the third unlicensed channel resource, thereby ensuring the reliability of transmitting the control signaling.

Here, the set rule may be specified by a communication protocol or configured by a base station, and may be singled to the terminal through a configured signaling. The configured signaling may include at least one of an RRC (Radio Resource Control) signaling, a MAC-CE (Media Access Control-Control Element) signaling, or a physical layer signaling.

At step 530, the control signaling is received via the third unlicensed channel resource.

In some embodiments of the present disclosure, when the first unlicensed channel resource is in the unavailable state, the terminal may receive the control signaling via the third unlicensed channel resource. The terminal may determine how to receive the control signaling via the second unlicensed channel resource according to the configuration from the base station.

From the above-mentioned embodiments, it may be understood that the third unlicensed channel resource reserved for transmitting the control signaling may be determined from the plurality of unlicensed channel resources according to the set rule, in response to detecting that the first unlicensed channel resource being configured for transmitting the control signaling in the plurality of unlicensed channel resources is in an unavailable state, and the control signaling may be received via the third unlicensed channel resource, which ensures secure transmission of the control signaling, improves the reliability of transmitting the control signaling, and improves service quality of the unlicensed channel resources.

In an embodiment, in the above step 510, the unavailable state may be determined with a configured signal, which may be implemented specifically as follows:

(4-1) detecting, on the first unlicensed channel resource, a configured signal for triggering the transmission of the control signaling;

(4-2) determining the first unlicensed channel resource that is in the available state when the configured signal is detected;

(4-3) determined the first unlicensed channel resource that is in the unavailable state when the configured signal is not detected.

In an embodiment, the configured signal in the above step (4-1) may be a DMRS (Demodulation Reference Signal).

From the above-mentioned embodiments, it may be understood that whether the first unlicensed channel resource is in the unavailable state may be determined depending on whether the configured signal is received or not, thereby improving the efficiency of transmitting the control signaling.

In an embodiment, the set rule in the above step 520 may include but not limited to the following four cases:

(5-1) The set rule includes a random order for the plurality of unlicensed channel resources.

In this case, when the step 520 is performed, all the unlicensed channel resources in the available state in the plurality of unlicensed channel resources may be determined as the third unlicensed channel resources according to the random order. Similarly, when the step 530 is performed, a signaling detection may be performed on each of the third unlicensed channel resources until the control signaling is received.

(5-2) The set rule includes a priority order for the plurality of unlicensed channel resources.

In this case, when the step 520 is performed, all the unlicensed channel resources in the available state in the plurality of unlicensed channel resources may be determined as the third unlicensed channel resources. Respective third unlicensed channel resources are sorted according to the priority order, to obtain respective ordered third unlicensed channel resources. Similarly, when the step 530 is performed, signaling detections may be performed on the respective ordered third unlicensed channel resources sequentially until the control signaling is received.

In the above steps (5-1) and (5-2), since it is not known to the terminal which unlicensed channel resource is determined as the second unlicensed channel resource reserved for transmitting the control signaling by the base station, the terminal will determine all possible unlicensed channel resources as the third unlicensed channel resources reserved for transmitting the control signaling.

For example, as shown in FIG. 3A, it is not known to the terminal which one of the bandwidth part 2, the bandwidth part 3 and the bandwidth part 4 is determined as the second unlicensed channel resource reserved for transmitting the control signaling by the base station. Accordingly, the terminal will determine all the bandwidth part 2, the bandwidth part 3 and the bandwidth part 4 as the third unlicensed channel resources reserved for transmitting the control signaling, assuming that all the bandwidth part 2, the bandwidth part 3 and the bandwidth part 4 are in the available state.

(5-3) The set rule includes a first correspondence between a transmission location on the first unlicensed channel resource that is configured for transmitting the control signaling and a reserved unlicensed channel resource.

In this case, when the step 520 is performed, the terminal may first determine a detection location corresponding to the unavailable state as a first transmission location, and then determine the reserved unlicensed channel resource corresponding to the first transmission location as the third unlicensed channel resource according to the first correspondence.

In the above step (5-3), since the reserved unlicensed channel resource for the first transmission location has been configured in advance, the second unlicensed channel resource determined by the base station reserved for transmitting the control signaling is the same as the third unlicensed channel resource determined by the terminal reserved for transmitting the control signaling.

(5-4) the set rule includes a constant unlicensed channel resource reserved for transmitting the control signaling.

In this case, when the step 520 is performed, the terminal may determine the constant unlicensed channel resource as the second unlicensed channel resource.

In the above step (5-4), no matter where the first transmission location is, it corresponds to the constant unlicensed channel resource. Accordingly, the second unlicensed channel resource determined by the base station reserved for transmitting the control signaling is also the same as the third unlicensed channel resource determined by the terminal reserved for transmitting the control signaling.

From the above-mentioned embodiments, it may be understood that different third unlicensed channel resources reserved for transmitting the control signaling may be determined according to different contents included in the set rule, which may improve the flexibility of the reserved transmission and also improve the efficiency of transmitting the control signaling.

In an embodiment, the set rule includes a second correspondence between the transmission location on the first unlicensed channel resource that is configured for transmitting the control signaling and the reserved transmission location. Then, when the step 530 is performed, the following steps may be further included:

(6-1) determining a detection location corresponding to the unavailable state as a first transmission location; and determining a third transmission location on the third unlicensed channel resource that is reserved for transmitting the control signaling according to the second correspondence; and (6-2) receiving the control signaling at the third transmission location on the third unlicensed channel resource.

In an embodiment, the third transmission location and the first transmission location have a same starting position or different starting positions with a limited time interval therebetween in time domain. Further, the set rule may include a configuration mode for representing configuration of the control signaling. Then, when the step (6-2) is performed, the control signaling may be received at the third transmission location on the third unlicensed channel resource according to the configuration mode.

Here, the above configuration mode may include information such as an information transmission format, a number of information transmission, a level of aggregation, or the like.

From the above-mentioned embodiments, it may be understood that the control signaling may be received at the third transmission location on the third unlicensed channel resource according to the configuration mode, thereby improving the accuracy of transmitting the control signaling.

Figure 6:
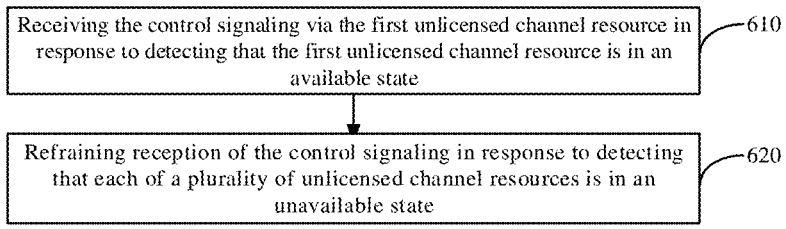
FIG. 6 is a flowchart illustrating another method for transmitting information according to an exemplary embodiment.

FIG. 6 illustrates a flowchart showing another method for transmitting information according to an exemplary embodiment. On a basis of the method illustrated in FIG. 5, as shown in FIG. 6, the method for transmitting information may further include the following steps 610-620.

At step 610, the control signaling is received via the first unlicensed channel resource in response to detecting that the first unlicensed channel resource is in an available state.

At step 620, reception of the control signaling is refrained in response to detecting that each of the plurality of unlicensed channel resources is in an unavailable state.

From the above-mentioned embodiments, it may be understood that the control signaling may be received via the first unlicensed channel resource in response to detecting that the first transmission location of the first unlicensed channel resource is in the available state directly; and reception of the control signaling may be refrained in response to detecting that each of the plurality of unlicensed channel resources is in the unavailable state, which avoids waste of resources and improves applicability of transmitting the control signaling.

Corresponding to the foregoing embodiments of the method for transmitting information, the present disclosure also provides embodiments of an apparatus for transmitting information.

Figure 7:
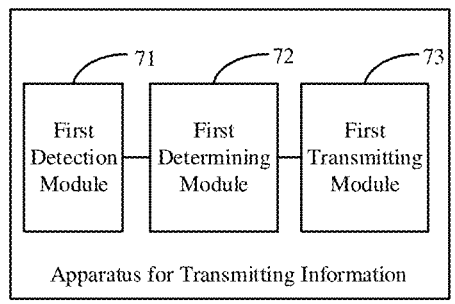
FIG. 7 is a block diagram illustrating an apparatus for transmitting information according to an exemplary embodiment.

FIG. 7 illustrates a block diagram showing an apparatus for transmitting information according to an exemplary embodiment. The apparatus may be applied to a base station, the base station configuring a plurality of unlicensed channel resources for a terminal, and may be used to execute the method for transmitting information as shown in FIG. 1. As shown in FIG. 7, the apparatus for transmitting information may include:

- a first detection module 71, configured to detect a first unlicensed channel resource of the plurality of unlicensed channel resources that is in an unavailable state, the first unlicensed channel resource being configured for transmitting control signaling;
- a first determining module 72, configured to determine a second unlicensed channel resource from the plurality of unlicensed channel resources according to a set rule, the second unlicensed channel resource being reserved for transmitting the control signaling; and
- a first transmitting module 73, configured to transmit the control signaling to the terminal via the second unlicensed channel resource.

From the above embodiments, it may be understood that the second unlicensed channel resource reserved for transmitting the control signaling may be determined from the plurality of unlicensed channel resources according to the set rule, in response to detecting that the first unlicensed channel resource being configured for transmitting the control signaling in the plurality of unlicensed channel resources is in an unavailable state, and the control signaling may be transmitted to the terminal via the second unlicensed channel resource, which ensures secure transmission of the control signaling, improves the reliability of transmitting the control signaling, and improves service quality of the unlicensed channel resources In an embodiment, the plurality of unlicensed channel resources include: a plurality of bandwidth parts configured on one unlicensed carrier, or a plurality of unlicensed carriers, or a plurality of bandwidth parts configured on a plurality of unlicensed carriers.

Figure 8:
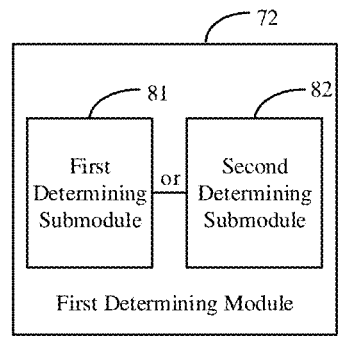
FIG. 8 is a block diagram illustrating another apparatus for transmitting information according to an exemplary embodiment.

In an embodiment, on a basis of the apparatus shown in FIG. 7, the set rule includes a random order or a priority order for the plurality of unlicensed channel resources. As shown in FIG. 8, the first determining module 72 may further include:

- a first determining submodule 81, configured to randomly select one or more unlicensed channel resources in the available state from the plurality of unlicensed channel resources based on the random order, as the second unlicensed channel resource; or
- a second determining submodule 82, configured to select one or more unlicensed channel resources in the available state from the plurality of unlicensed channel resources preferentially according to the priority order, as the second unlicensed channel resource.

Figure 9:
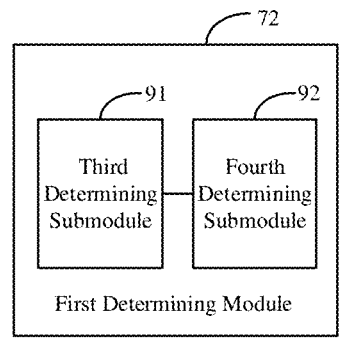
FIG. 9 is a block diagram illustrating another apparatus for transmitting information according to an exemplary embodiment.

In an embodiment, on a basis of the apparatus as shown in FIG. 7, the set rule includes a first correspondence between a transmission location on the first unlicensed channel resource that is configured for transmitting the control signaling and a reserved unlicensed channel resource. As shown in FIG. 9, the first determining module 72 may further include:

- a third determining submodule 91, configured to determine a detection location corresponding to the unavailable state as a first transmission location; and
- a fourth determining submodule 92, configured to determine the reserved unlicensed channel resource corresponding to the first transmission location as the second unlicensed channel resource according to the first correspondence.

Figure 10:
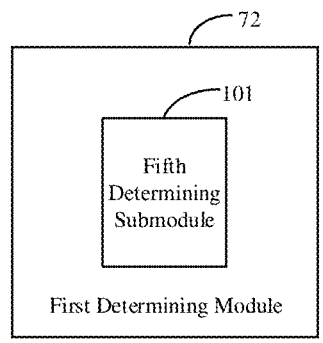
FIG. 10 is a block diagram illustrating another apparatus for transmitting information according to an exemplary embodiment.

In an embodiment, on a basis of the apparatus as shown in FIG. 7, the set rule includes a constant unlicensed channel resource reserved for transmitting the control signaling. As shown in FIG. 10, the first determining module 72 may further include:

- a fifth determining submodule 101, configured to determine the constant unlicensed channel resource as the second unlicensed channel resource.

From the above-mentioned embodiments, it may be understood that different second unlicensed channel resources reserved for transmitting the control signaling may be determined according to different contents included in the set rule, which may improve the flexibility of the reserved transmission and also improve the efficiency of transmitting the control signaling.

Figure 11:
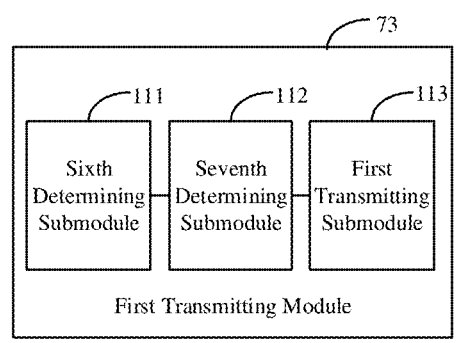
FIG. 11 is a block diagram illustrating another apparatus for transmitting information according to an exemplary embodiment.

In an embodiment, on a basis of the apparatus as shown in FIG. 7, the set rule includes a second correspondence between the transmission location on the first unlicensed channel resource that is configured for transmitting the control signaling and the reserved transmission location. As shown in FIG. 11, the first transmitting module 73 may include:

- a sixth determining submodule 111, configured to determine a detection location corresponding to the unavailable state as a first transmission location;
- a seventh determining submodule 112, configured to determine a second transmission location on the second unlicensed channel resource that is reserved for transmitting the control signaling according to the reserved transmission location corresponding to the first transmission location in the second correspondence; and
- a first transmitting submodule 113, configured to transmit the control signaling to the terminal at the second transmission location on the second unlicensed channel resource.

Figure 12:
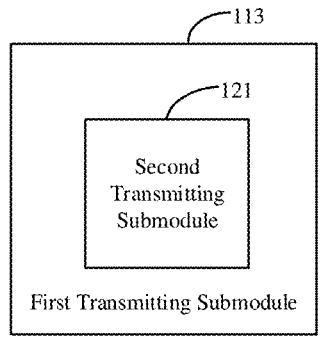
FIG. 12 is a block diagram illustrating another apparatus for transmitting information according to an exemplary embodiment.

In an embodiment, on a basis of the apparatus as shown in FIG. 11, the second transmission location and the first transmission location have a same starting position or different starting positions with a limited time interval therebetween in time domain. Further, the set rule may include a configuration mode for representing configuration of the control signaling. As shown in FIG. 12, the first transmitting submodule 113 may further include:

- a second transmitting submodule 121, configured to transmit the control signaling to the terminal at the second transmission location on the second unlicensed channel resource according to the configuration mode.

From the above-mentioned embodiments, it may be understood that the control signaling may be transmitted to the terminal at the second transmission location on the second unlicensed channel resource according to the configuration mode, thereby improving the accuracy of transmitting the control signaling.

Figure 13:
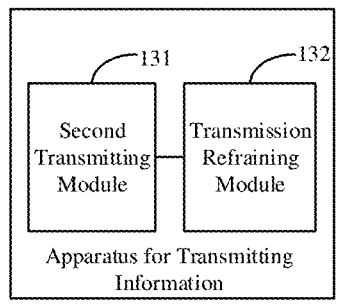
FIG. 13 is a block diagram illustrating another apparatus for transmitting information according to an exemplary embodiment.

In an embodiment, on a basis of the apparatus as shown in FIG. 7, as shown in FIG. 13, the apparatus may further include:

- a second transmitting module 131, configured to transmit the control signaling to the terminal via the first unlicensed channel resource in response to detecting that the first unlicensed channel resource is in an available state; and
- a transmission refraining module 132, configured to refrain the transmission of the control signaling in response to detecting that each of the plurality of unlicensed channel resources is in an unavailable state.

From the above-mentioned embodiments, it may be understood that the control signaling may be transmitted to the terminal via the first unlicensed channel resource directly in response to detecting that the first unlicensed channel resource is in the available state, and the transmission of the control signaling may be refrained in response to detecting that each of the plurality of unlicensed channel resources is in the unavailable state, which avoids waste of resources and improves applicability of transmitting the control signaling.

Figure 14:
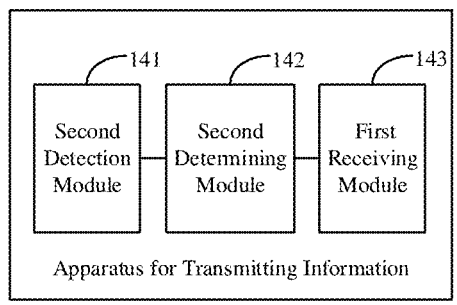
FIG. 14 is a block diagram illustrating an apparatus for transmitting information according to an exemplary embodiment.

FIG. 14 illustrates a block diagram showing an apparatus for transmitting information according to an exemplary embodiment. The apparatus may be applied to a terminal, a base station configuring a plurality of unlicensed channel resources for the terminal, and may be used to execute the method for transmitting information as shown in FIG. 5. As shown in FIG. 14, the apparatus for transmitting information may include:
- a second detection module 141, configured to detect a first unlicensed channel resource of the plurality of unlicensed channel resources that is in an unavailable state, the first unlicensed channel resource being configured for transmitting control signaling;
- a second determining module 142, configured to determine a third unlicensed channel resource from the plurality of unlicensed channel resources that is reserved for transmitting the control signaling according to a set rule; and
- a first receiving module 143, configured to receive the control signaling via the third unlicensed channel resource.

From the above-mentioned embodiments, it may be understood that the third unlicensed channel resource reserved for transmitting the control signaling may be determined from the plurality of unlicensed channel resources according to the set rule, in response to detecting that the first unlicensed channel resource being configured for transmitting the control signaling in the plurality of unlicensed channel resources is in an unavailable state, and the control signaling may be received via the third unlicensed channel resource, which ensures secure transmission of the control signaling, improves the reliability of transmitting the control signaling, and improves service quality of the unlicensed channel resources.

In an embodiment, the plurality of unlicensed channel resources may include a plurality of bandwidth parts configured on one unlicensed carrier, or a plurality of unlicensed carriers, or a plurality of bandwidth parts configured on a plurality of unlicensed carriers.

Figure 15:
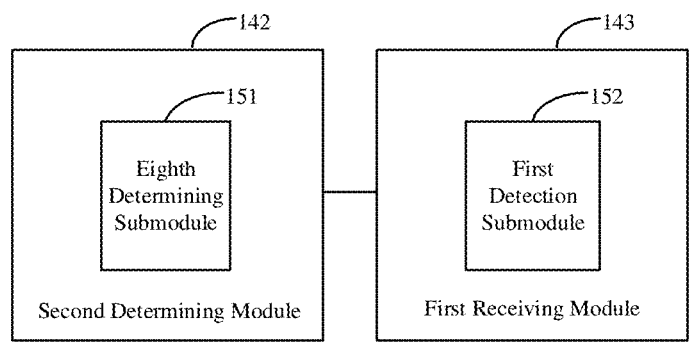
FIG. 15 is a block diagram illustrating another apparatus for transmitting information according to an exemplary embodiment.

In an embodiment, on a basis of the apparatus as shown in FIG. 14, the set rule includes a random order for the plurality of unlicensed channel resources. As shown in FIG. 15, the second determining module 142 may further include:
- an eighth determining submodule 151, configured to determine all the unlicensed channel resources in the available state in the plurality of unlicensed channel resources as the third unlicensed channel resources according to the random order;

The first receiving module 143 may further include:
- a first detection submodule 152, configured to perform a signaling detection on each of the third unlicensed channel resources until the control signaling is received.

Figure 16:
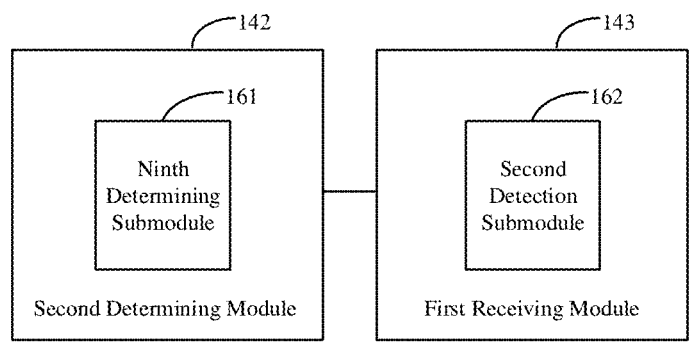
FIG. 16 is a block diagram illustrating another apparatus for transmitting information according to an exemplary embodiment.

In an embodiment, on a basis of the apparatus as shown in FIG. 14, the set rule includes a priority order for the plurality of unlicensed channel resources. As shown in FIG. 16, the second determining module 142 may further include:
- a ninth determining submodule 161, configured to determine all the unlicensed channel resources in the available state in the plurality of unlicensed channel resources as the third unlicensed channel resources.

The first receiving module 143 may further include:
- a second detection submodule 162, configured to perform signaling detections on the respective ordered third unlicensed channel resources sequentially until the control signaling is received.

Figure 17:
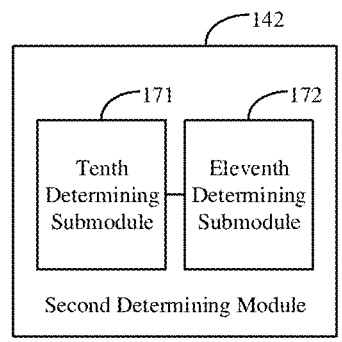
FIG. 17 is a block diagram illustrating another apparatus for transmitting information according to an exemplary embodiment.

In an embodiment, on a basis of the apparatus as shown in FIG. 14, the set rule includes a first correspondence between a transmission location on the first unlicensed channel resource that is configured for transmitting the control signaling and a reserved unlicensed channel resource. As shown in FIG. 17, the second determining module 142 may further include:
- a tenth determining sub-module 171, configured to determine a detection location corresponding to the unavailable state as a first transmission location; and
- an eleventh determining submodule 172, configured to determine the reserved unlicensed channel resource corresponding to the first transmission location as the third unlicensed channel resource according to the first correspondence.

Figure 18:
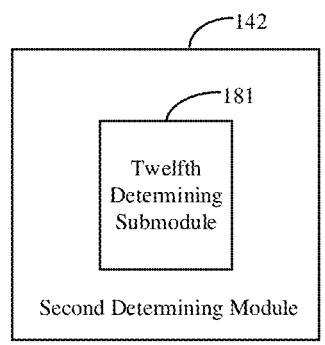
FIG. 18 is a block diagram illustrating another apparatus for transmitting information according to an exemplary embodiment.

In an embodiment, on a basis of the apparatus as shown in FIG. 14, the set rule includes a constant unlicensed channel resource reserved for transmitting the control signaling. As shown in FIG. 18, the second determining module 142 may further include:
- a twelfth determining submodule 181, configured to determine the constant unlicensed channel resource as the third unlicensed channel resource.

From the above-mentioned embodiments, it may be understood that different third unlicensed channel resources reserved for transmitting the control signaling may be determined according to different contents included in the set rule, which may improve the flexibility of the reserved transmission and also improve the efficiency of transmitting the control signaling.

Figure 19:
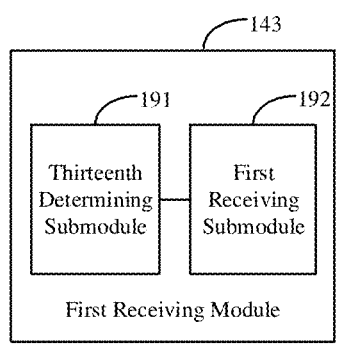
FIG. 19 is a block diagram illustrating another apparatus for transmitting information according to an exemplary embodiment.

In an embodiment, on a basis of the apparatus as shown in FIG. 14, the set rule includes a second correspondence between the transmission location on the first unlicensed channel resource that is configured for transmitting the control signaling and the reserved transmission location. As shown in FIG. 19, the first receiving module 143 may further include:
- a thirteenth determining submodule 191, configured to determine a third transmission location on the third unlicensed channel resource that is reserved for transmitting the control signaling according to a reserved transmission location corresponding to the first transmission location in the second correspondence; and
- a first receiving submodule 192, configured to receive the control signaling at the third transmission location on the third unlicensed channel resource.

Figure 20:
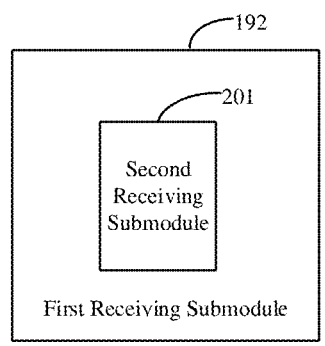
FIG. 20 is a block diagram illustrating another apparatus for transmitting information according to an exemplary embodiment.

In an embodiment, on a basis of the apparatus as shown in FIG. 19, the second transmission location and the first transmission location have a same starting position or different starting positions with a limited time interval therebetween in time domain. Further, the set rule may include a configuration mode for representing configuration of the control signaling. As shown in FIG. 20, the first receiving submodule 192 may further include:

a second receiving submodule 201, configured to receive the control signaling at the third transmission location on the third unlicensed channel resource according to the configuration mode.

From the above-mentioned embodiments, it may be understood that the control signaling may be received at the third transmission location on the third unlicensed channel resource according to the configuration mode, thereby improving the accuracy of transmitting the control signaling.

In an embodiment, on a basis of any of the apparatuses as shown in FIGS. 15 to 20, the set rule may be specified by a communication protocol or configured by the base station, and may be singled to the terminal through a configured signaling. The configured signaling may include at least one of an RRC (Radio Resource Control) signaling, a MAC-CE (Media Access Control-Control Element) signaling, or a physical layer signaling.

Figure 21:
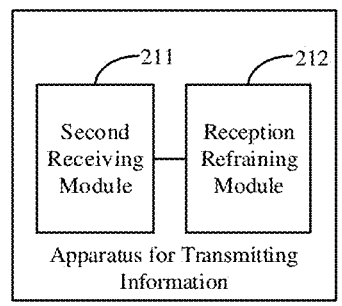
FIG. 21 is a block diagram illustrating another apparatus for transmitting information according to an exemplary embodiment.

In an embodiment, on a basis of the apparatus as shown in FIG. 14, as shown in FIG. 21, the apparatus may further include:

a second receiving module 211, configured to receive the control signaling via the first unlicensed channel resource in response to detecting that the first unlicensed channel resource is in an available state; and a reception refraining module 212, configured to refrain reception of the control signaling in response to detecting that each of the plurality of unlicensed channel resources is in an unavailable state.

From the above-mentioned embodiments, it may be understood that the control signaling may be received via the first unlicensed channel resource in response to detecting that the first transmission location of the first unlicensed channel resource is in the available state directly; and reception of the control signaling may be refrained in response to detecting that each of the plurality of unlicensed channel resources is in the unavailable state, which avoids waste of resources and improves applicability of transmitting the control signaling.

As for the apparatus embodiments which basically correspond to the method embodiments, the relevant related parts thereof refer to the corresponding descriptions of the method embodiments. The apparatus embodiments described above are merely illustrative. The units described above as separate components may or may not be physically separated; the components displayed as units may or may not be physical units and may be located in one unit or may be distributed onto a plurality of network units. Some or all of the modules may be selected according to the actual needs to achieve the objectives of the solutions of the present disclosure. It may be understood and implemented by those skilled in the art without creative work.

The present disclosure also provides a non-transitory computer-readable storage medium having a computer program stored thereon, the computer program is configured to execute any of the methods for transmitting information described in FIG. 1 to FIG. 4 above.

The present disclosure also provides a non-transitory computer-readable storage medium having a computer program stored thereon, the computer program is configured to execute any of the methods for transmitting information described in FIG. 5 to FIG. 6 above.

The present disclosure also provides an apparatus for transmitting information. The apparatus is used in a base station, and the base station configures a plurality of unlicensed channel resources for a terminal. The apparatus includes:

a processor; and a memory configured to store instructions executable by the processor;

wherein the processor is configured to:

detect a first unlicensed channel resource of the plurality of unlicensed channel resources that is in an unavailable state, the first unlicensed channel resource being configured for transmitting control signaling;

determine a second unlicensed channel resource from the plurality of unlicensed channel resources according to a set rule, the second unlicensed channel resource being reserved for transmitting the control signaling; and transmit the control signaling to the terminal via the second unlicensed channel resource.

Figure 22:
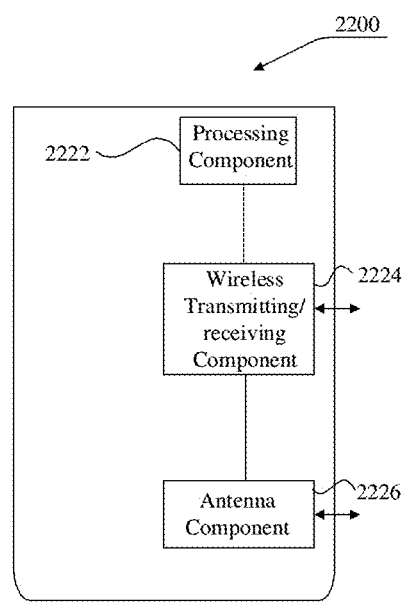
FIG. 22 is a structural schematic diagram illustrating an apparatus for transmitting information according to an exemplary embodiment.

As shown in FIG. 22, FIG. 22 is a structural schematic diagram illustrating an apparatus for transmitting information according to an exemplary embodiment. The apparatus 2200 may be provided as a base station. Referring to FIG. 22, the apparatus 2200 includes a processing component 2222, a wireless transmitting/receiving component 2224, an antenna component 2226, and a signal processing part specific to a wireless interface. The processing component 2222 may further include one or more processors.

One of the processors in the processing component 2222 may be configured to execute any of the information transmission methods.

The present disclosure also provides an apparatus for transmitting information. The apparatus is used in a terminal, and a base station configures a plurality of unlicensed channel resources for the terminal. The apparatus includes:

a processor; and a memory configured to store instructions executable by the processor;

wherein the processor is configured to:

detect a first unlicensed channel resource of the plurality of unlicensed channel resources that is in an unavailable state, the first unlicensed channel resource being configured for transmitting control signaling;

determine a third unlicensed channel resource from the plurality of unlicensed channel resources that is reserved for transmitting the control signaling according to a set rule; and receive the control signaling via the third unlicensed channel resource.

Figure 23:
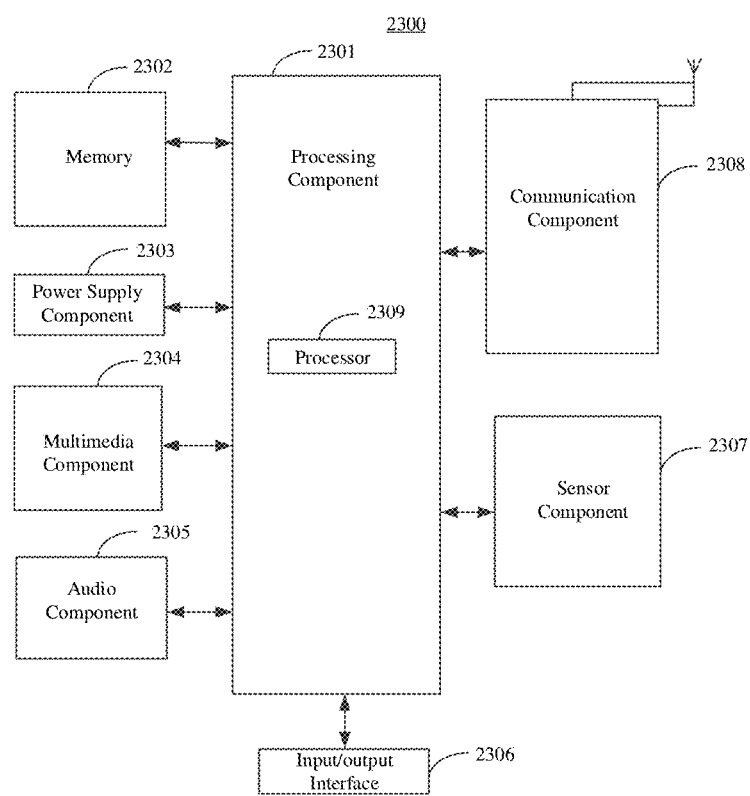
FIG. 23 is a structural schematic diagram illustrating an apparatus for transmitting information according to an exemplary embodiment.

FIG. 23 is a structural schematic diagram illustrating an apparatus for transmitting information according to an exemplary embodiment. As shown in FIG. 23, an apparatus 2300 for transmitting information is shown according to an exemplary embodiment. The apparatus 2300 may be a computer, a mobile phone, a digital broadcasting terminal, a message transmitting and receiving device, a game console, a tablet device, a medical device, a fitness device, a personal digital assistant and other terminals.

Referring to FIG. 23, the apparatus 2300 may include one or more of the following components: a processing component 2301, a memory 2302, a power supply component 2303, a multimedia component 2304, an audio component 2305, an input/output (I/O) interface 2306, a sensor component 2307, and a communication component 2308.

The processing component 2301 generally controls the overall operations of the apparatus 2300, such as operations associated with display, telephone calls, data communications, camera operations, and recording operations. The processing component 2301 may include one or more processors 2309 to execute instructions to complete all or part of the steps of the method described above. Additionally, the processing component 2301 may include one or more modules to facilitate the interaction between the processing component 2301 and other components. For example, the processing component 2301 may include a multimedia module to facilitate the interaction between the multimedia component 2304 and the processing component 2301.

The memory 2302 is configured to store various types of data to support the operations of the apparatus 2300. Examples of these data include instructions for any application or method operating on the apparatus 2300, contact data, phone book data, messages, pictures, videos, etc. The memory 2302 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 2303 provides power to various components of the apparatus 2300. The power supply component 2303 may include a power management system, one or more power supplies, and other components associated with generating, managing and distributing power for the apparatus 2300.

The multimedia component 2304 includes a screen providing an output interface between the apparatus 2300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense the touches, slides, and gestures on the touch panel. The touch sensors may not only sense a boundary of a touch or slide, but also detect a duration and pressure related to the touch or slide operation. In some embodiments, the multimedia component 2304 includes a front camera and/or a rear camera. When the apparatus 2300 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 2305 is configured to output and/or input audio signals. For example, the audio component 2305 includes a microphone (MIC). When the apparatus 2300 is in an operation mode, such as a calling mode, a recording mode, and a voice recognition mode, the microphone is configured to receive external audio signals. The received audio signals may be further stored in the memory 2302 or transmitted via the communication component 2308. In some embodiments, the audio component 2305 further includes a speaker for outputting audio signals.

The I/O interface 2306 provides an interface between the processing component 2301 and a peripheral interface module. The peripheral interface module may be a keyboard, a click wheel, a button, and so on. These buttons may include but not limited to: a home button, a volume button, a start button, and a lock button.

The sensor component 2307 includes one or more sensors for providing the apparatus 2300 with status assessments of various aspects. For example, the sensor component 2307 may detect the opening/closing state of the apparatus 2300 and relative locations of the components. For example, the component is a display and a keypad of the apparatus 2300. The sensor component 2307 may also detect location changes of the apparatus 2300 or a component of the apparatus 2300, presence or absence of contact between the user and the apparatus 2300, orientation or acceleration/deceleration of the apparatus 2300, and temperature changes of the apparatus 2300. The sensor component 2307 may include a proximity sensor configured to detect the presence of nearby objects without any physical contacts. The sensor component 2307 may also include a light sensor, such as a CMOS or CCD image sensor, for use in imaging applications. In some embodiments, the sensor component 2307 may also include an acceleration sensor, a gyroscope sensor, a magnetic sensor, a pressure sensor or a temperature sensor.

The communication component 2308 is configured to facilitate wired or wireless communications between the apparatus 2300 and other devices. The apparatus 2300 may access a wireless network based on a communication standard, such as a WiFi, a 2G or 3G, or a combination thereof. In an exemplary embodiment, the communication component 2308 receives a broadcast signal or broadcast related information from an external broadcast management system via a broadcast channel. In an exemplary embodiment, the communication component 2308 further includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an exemplary embodiment, the apparatus 2300 may be implemented by one or more application specific integrated circuits (ASICs), digital signal processors (DSP), digital signal processing devices (DSPD), programmable logic devices (PLD), Field programmable gate arrays (FPGA), controllers, microcontrollers, microprocessors or other electronic elements to perform the above methods.

In an exemplary embodiment, a non-transitory computer-readable storage medium including instructions is also provided, such as a memory 2302 including instructions which may be executed by the processor 2309 of the apparatus 2300 to complete the method described above. For example, the non-transitory computer-readable storage medium may be a ROM, a random access memory (RAM), a CD-ROM, a magnetic tape, a floppy disk, an optical data storage device, etc.

Wherein the instructions in the storage medium when executed by the processor cause the apparatus 2300 to perform any of the methods for transmitting information described above.

After considering the specification and practicing the disclosure disclosed herein, those skilled in the art will easily envisage other embodiments of the present disclosure. This application is intended to cover any variations, usages, or adaptive changes of the present disclosure, which follow the general principles of the present disclosure and include well known knowledge or conventional technical means in the technical field which are not disclosed in the present disclosure. The specification and embodiments are only regarded as exemplary, and the true scope and spirit of the present disclosure are indicated in the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for transmitting information, comprising:
    detecting a first unlicensed channel resource of a plurality of unlicensed channel resources that is in an unavailable state, the first unlicensed channel resource being configured for transmitting control signaling, and the plurality of unlicensed channel resources being configured for a terminal;
determining a second unlicensed channel resource from the plurality of unlicensed channel resources according to a set rule, the second unlicensed channel resource being reserved for transmitting the control signaling; and
transmitting the control signaling to the terminal via the second unlicensed channel resource;
wherein the set rule comprises a correspondence between a transmission location on the first unlicensed channel resource that is configured for transmitting the control signaling and a reserved unlicensed channel resource, and
the determining the second unlicensed channel resource from the plurality of unlicensed channel resources according to the set rule comprises:
determining a detection location corresponding to the unavailable state as a first transmission location;
determining the reserved unlicensed channel resource corresponding to the first transmission location as the second unlicensed channel resource according to the correspondence.

2. The method of claim 1, wherein the plurality of unlicensed channel resources comprise a plurality of bandwidth parts configured on one unlicensed carrier, or a plurality of unlicensed carriers, or a plurality of bandwidth parts configured on a plurality of unlicensed carriers.

3. The method of claim 1, wherein the set rule comprises a random order or a priority order for the plurality of unlicensed channel resources, and
the determining the second unlicensed channel resource from the plurality of unlicensed channel resources according to the set rule comprises:
randomly selecting one or more unlicensed channel resources in an available state from the plurality of unlicensed channel resources based on the random order, as the second unlicensed channel resource; or
selecting one or more unlicensed channel resources in the available state from the plurality of unlicensed channel resources preferentially according to the priority order, as the second unlicensed channel resource.

4. The method of claim 1, wherein the set rule comprises a constant unlicensed channel resource reserved for transmitting the control signaling, and
the determining the second unlicensed channel resource from the plurality of unlicensed channel resources according to the set rule comprises:
determining the constant unlicensed channel resource as the second unlicensed channel resource.

5. The method of claim 1, wherein the set rule comprises a correspondence between a transmission location on the first unlicensed channel resource that is configured for transmitting the control signaling and a reserved transmission location, and
the transmitting the control signaling to the terminal via the second unlicensed channel resource comprises:
determining a detection location corresponding to the unavailable state as a first transmission location;
determining a second transmission location on the second unlicensed channel resource that is reserved for transmitting the control signaling according to the reserved transmission location corresponding to the first transmission location in the correspondence; and
transmitting the control signaling to the terminal at the second transmission location on the second unlicensed channel resource.

6. The method of claim 5, wherein the second transmission location and the first transmission location have a same starting position or different starting positions with a limited time interval therebetween in time domain;
wherein the set rule further comprises a configuration mode for representing configuration of the control signaling, and
the transmitting the control signaling to the terminal at the second transmission location on the second unlicensed channel resource comprises:
transmitting the control signaling to the terminal at the second transmission location on the second unlicensed channel resource according to the configuration mode.

7. The method of claim 1, wherein the method further comprises:
transmitting the control signaling to the terminal via the first unlicensed channel resource in response to detecting that the first unlicensed channel resource is in an available state;
refraining transmission of the control signaling in response to detecting that each of the plurality of unlicensed channel resources is in an unavailable state.

8. A method for transmitting information, comprising:
detecting a first unlicensed channel resource of a plurality of unlicensed channel resources that is in an unavailable state, the first unlicensed channel resource being configured for transmitting control signaling, and the plurality of unlicensed channel resources being configured by a base station;
determining a second unlicensed channel resource from the plurality of unlicensed channel resources that is reserved for transmitting the control signaling according to a set rule; and
receiving the control signaling via the second unlicensed channel resource;
wherein the set rule comprises a correspondence between a transmission location on the first unlicensed channel resource that is configured for transmitting the control signaling and a reserved unlicensed channel resource, and
the determining the second unlicensed channel resource from the plurality of unlicensed channel resources that is reserved for transmitting the control signaling according to the set rule comprises:
determining a detection location corresponding to the unavailable state as a first transmission location; and
determining the reserved unlicensed channel resource corresponding to the first transmission location as the second unlicensed channel resource according to the correspondence.

9. The method of claim 8, wherein the plurality of unlicensed channel resources comprise a plurality of bandwidth parts configured on one unlicensed carrier, or a plurality of unlicensed carriers, or a plurality of bandwidth parts configured on a plurality of unlicensed carriers.

10. The method of claim 8, wherein the set rule comprises a random order for the plurality of unlicensed channel resources, and
the determining the second unlicensed channel resource from the plurality of unlicensed channel resources according to the set rule comprises:
determining all unlicensed channel resources in the available state in the plurality of unlicensed channel resources as second unlicensed channel resources according to the random order, and the receiving the control signaling via the second unlicensed channel resource comprises:

performing a signaling detection on each of the second unlicensed channel resources until the control signaling is received.

11. The method of claim 8, wherein the set rule comprises a priority order for the plurality of unlicensed channel resources, and the determining the second unlicensed channel resource from the plurality of unlicensed channel resources that is reserved for transmitting the control signaling according to the set rule comprises:

determining all unlicensed channel resources in the available state in the plurality of unlicensed channel resources as second unlicensed channel resources; and sorting the respective second unlicensed channel resources according to the priority order, to obtain ordered second unlicensed channel resources, and the receiving the control signaling via the second unlicensed channel resource comprises:

performing signaling detections on the respective ordered second unlicensed channel resources sequentially until the control signaling is received.

12. The method of claim 8, wherein the set rule comprises a constant unlicensed channel resource reserved for transmitting the control signaling, and the determining the second unlicensed channel resource from the plurality of unlicensed channel resources according to the set rule comprises:

determining the constant unlicensed channel resource as the second unlicensed channel resource.

13. The method of claim 8, wherein the set rule comprises a correspondence between a transmission location on the first unlicensed channel resource that is configured for transmitting the control signaling and a reserved transmission location, and the receiving the control signaling via the second unlicensed channel resource comprises:

determining a detection location corresponding to the unavailable state as a first transmission location;

determining a second transmission location on the second unlicensed channel resource that is reserved for transmitting the control signaling according to the reserved transmission location corresponding to the first transmission location in the correspondence; and receiving the control signaling at the second transmission location on the second unlicensed channel resource.

14. The method of claim 13, wherein the second transmission location and the first transmission location have a same starting position or different starting positions with a limited time interval therebetween in time domain, and wherein the set rule further comprises a configuration mode for representing configuration of the control signaling, and the receiving the control signaling at the second transmission location on the second unlicensed channel resource comprises:

receiving the control signaling at the second transmission location on the second unlicensed channel resource according to the configuration mode.

15. The method of claim 10, wherein the set rule is specified by a communication protocol, or signaled to a terminal by the base station through a configured signaling, the configured signaling comprising at least one of:

an RRC (Radio Resource Control) signaling; or a MAC-CE (Media Access Control-Control Element) signaling; or a physical layer signaling.

16. The method of claim 8, wherein the method further comprises:

receiving the control signaling via the first unlicensed channel resource in response to detecting that the first unlicensed channel resource is in an available state; and refraining reception of the control signaling in response to detecting that each of the plurality of unlicensed channel resources is in an unavailable state.

17. An apparatus for transmitting information, comprising:

a processor; and a memory configured to store instructions executable by the processor;

wherein the processor is configured to:

detect a first unlicensed channel resource of a plurality of unlicensed channel resources as being in an unavailable state, the first unlicensed channel resource being configured for transmitting control signaling, and the plurality of unlicensed channel resources being configured for a terminal;

determine a second unlicensed channel resource from the plurality of unlicensed channel resources according to a set rule, the second unlicensed channel resource being reserved for transmitting the control signaling; and transmit the control signaling to the terminal via the second unlicensed channel resource;

wherein the set rule comprises a correspondence between a transmission location on the first unlicensed channel resource that is configured for transmitting the control signaling and a reserved unlicensed channel resource, and the processor is configured to determine the second unlicensed channel resource from the plurality of unlicensed channel resources according to the set rule by:

determining a detection location corresponding to the unavailable state as a first transmission location; and determining the reserved unlicensed channel resource corresponding to the first transmission location as the second unlicensed channel resource according to the correspondence.

18. An apparatus for transmitting information, comprising:

a processor; and a memory configured to store instructions executable by the processor;

wherein the processor is configured to:

detect a first unlicensed channel resource of a plurality of unlicensed channel resources that is in an unavailable state, the first unlicensed channel resource being configured for transmitting control signaling, and the plurality of unlicensed channel resources being configured by a base station;

determine a second unlicensed channel resource from the plurality of unlicensed channel resources that is reserved for transmitting the control signaling according to a set rule; and receive the control signaling via the second unlicensed channel resource;

wherein the set rule comprises a correspondence between a transmission location on the first unlicensed channel resource that is configured for transmitting the control signaling and a reserved unlicensed channel resource, and the processor is configured to determine the second unlicensed channel resource from the plurality of unlicensed channel resources that is reserved for transmitting the control signaling according to the set rule by:
determining a detection location corresponding to the unavailable state as a first transmission location; and
determining the reserved unlicensed channel resource corresponding to the first transmission location as the second unlicensed channel resource according to the correspondence.

\* \* \* \* \*